US011924619B2

(12) United States Patent
Davis et al.

(10) Patent No.: US 11,924,619 B2
(45) Date of Patent: *Mar. 5, 2024

(54) RENDERING BINAURAL AUDIO OVER MULTIPLE NEAR FIELD TRANSDUCERS

(71) Applicant: DOLBY LABORATORIES LICENSING CORPORATION, San Francisco, CA (US)

(72) Inventors: Mark F. Davis, Pacifica, CA (US); Nicolas R. Tsingos, San Francisco, CA (US); C. Phillip Brown, Castro Valley, CA (US)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/943,019

(22) Filed: Sep. 12, 2022

(65) Prior Publication Data

US 2023/0074817 A1 Mar. 9, 2023

Related U.S. Application Data

(63) Continuation of application No. 17/262,509, filed as application No. PCT/US2019/042988 on Jul. 23, 2019, now Pat. No. 11,445,299.

(Continued)

(30) Foreign Application Priority Data

Jul. 23, 2018 (EP) .................................... 18184900

(51) Int. Cl.

*H04R 5/033* (2006.01)
*H04S 7/00* (2006.01)

(52) U.S. Cl.

CPC ............ *H04R 5/033* (2013.01); *H04S 7/304* (2013.01); *H04R 2205/022* (2013.01);

(Continued)

(58) Field of Classification Search

CPC . H04S 7/306; H04S 7/30; H04S 1/002; H04S 2420/01; H04S 7/00; H04R 5/033

(Continued)

(56) References Cited

U.S. PATENT DOCUMENTS 5,661,812 A 8/1997 Scofield
6,356,644 B1 3/2002 Pollak (Continued)

FOREIGN PATENT DOCUMENTS

CN 107113524 B 8/2017
EP 1143766 10/2001

(Continued)

OTHER PUBLICATIONS

Brown, C.P. et al "An Efficient HRTF Model for 3-D Sound" WASPAA 1997 IEEE Assp Workshop on Applications of Signal Processing to Audio and Acoustics, Mohonk Mountain House, New Paltz,, NY, Oct. 1997.

(Continued)

*Primary Examiner* — Yosef K Laekemariam

(57) ABSTRACT

An apparatus and method of rendering audio. A binaural signal is split on an amplitude weighting basis into a front binaural signal and a rear binaural signal, based on perceived position information of the audio. In this manner, the front-back differentiation of the binaural signal is improved.

12 Claims, 11 Drawing Sheets

Related U.S. Application Data

(60) Provisional application No. 62/702,001, filed on Jul. 23, 2018.

(52) U.S. Cl.
CPC .... *H04R 2205/024* (2013.01); *H04S 2420/01* (2013.01); *H04S 2420/03* (2013.01); *H04S 2420/11* (2013.01)

(58) Field of Classification Search
USPC ................ 381/1, 5, 17, 18, 80, 85, 309, 310
See application file for complete search history.

(56) References Cited

U.S. PATENT DOCUMENTS

| | | | | |
|---|---|---|---|---|
| 6,577,736 | B1 * | 6/2003 | Clemow | H04R 5/02 381/17 |
| 6,801,627 | B1 | 10/2004 | Kobayashi | |
| 8,767,968 | B2 | 7/2014 | Flaks | |
| 2001/0031062 | A1 * | 10/2001 | Terai | H04S 3/004 381/370 |
| 2004/0032964 | A1 | 2/2004 | Liang | |
| 2004/0062401 | A1 | 4/2004 | Davis | |
| 2006/0083394 | A1 | 4/2006 | McGrath | |
| 2007/0098198 | A1 | 5/2007 | Hildebrandt | |
| 2009/0097666 | A1 | 4/2009 | Kim | |
| 2010/0246832 | A1 | 9/2010 | Villemoes | |
| 2011/0211702 | A1 | 9/2011 | Mundt | |
| 2014/0153765 | A1 | 6/2014 | Gan | |
| 2014/0334637 | A1 | 11/2014 | Oswald | |
| 2015/0245157 | A1 | 8/2015 | Seefeldt | |
| 2017/0078821 | A1 * | 3/2017 | Faller | H04S 1/002 |
| 2017/0153866 | A1 | 6/2017 | Grinberg | |
| 2019/0327575 | A1 | 10/2019 | Brown | |

FOREIGN PATENT DOCUMENTS

| | | | |
|---|---|---|---|
| JP | 2009141879 | | 6/2009 |
| WO | 2005053354 | A1 | 6/2005 |
| WO | 2017223110 | | 12/2017 |

OTHER PUBLICATIONS

Woodworth, R.S. et al "Experimental Psychology", pp. 349-361, Holt, Rinehart and Winston, NY, 1962.

* cited by examiner

RENDERING BINAURAL AUDIO OVER MULTIPLE NEAR FIELD TRANSDUCERS

CROSS REFERENCE TO RELATED APPLICATIONS

This application is a continuation of U.S. patent application Ser. No. 17/262,509 filed Jan. 22, 2021, which claims the benefit of priority from U.S. Provisional Patent Application No. 62/702,001 and European Patent Application No. 18184900.1, both filed on 23 Jul. 2018, and incorporated herein by reference.

BACKGROUND

The present invention relates to audio processing, and in particular, to binaural audio processing for multiple loudspeakers.

Unless otherwise indicated herein, the approaches described in this section are not prior art to the claims in this application and are not admitted to be prior art by inclusion in this section.

Head tracking (or headtracking) generally refers to tracking the pose (e.g., the position and orientation) of a user's head to adjust the input to, or output of, a system. For audio, headtracking refers to changing an audio signal according to the head orientation/position of a listener.

Binaural audio generally refers to audio that is recorded, or played back, in such a way that accounts for the natural ear spacing and head shadow of the ears and head of a listener. The listener thus perceives the sounds to originate in one or more spatial locations. Binaural audio may be recorded by using two microphones placed at the two ear locations of a dummy head. Binaural audio may be rendered from audio that was recorded non-binaurally by using a head-related transfer function (HRTF) or a binaural room impulse response (BRIR). Binaural audio may be played back using headphones. Binaural audio generally includes a left channel (to be output by the left headphone), and a right channel (to be output by the right headphone). Binaural audio differs from stereo in that stereo audio may involve loudspeaker crosstalk between the loudspeakers. If binaural audio is to be output from loudspeakers, it is often desirable to perform crosstalk cancellation; an example is described in U.S. Application Pub. No. 2015/0245157.

Quad binaural generally refers to binaural that has been recorded as four pairs of binaural (e.g., left and right channels for each of the four directions: north at 0 degrees, east at 90 degrees, south at 180 degrees, and west at 270 degrees). During playback, if the listener is facing one of the four directions, the binaural signal recorded from that direction is played back. If the listener is facing between two directions, the signal played back is a mixture of the two signals recorded from those two directions.

Binaural audio is often output from headsets or other head-mounted systems. A number of publications describe head-mounted audio systems (that in various ways differ from standard audio headsets). Examples include U.S. Pat. Nos. 5,661,812; 6,356,644; 6,801,627; 8,767,968; U.S. Application Pub. No. 2014/0153765; U.S. Application Pub. No. 2017/0153866; U.S. Application Pub. No. 2004/0032964; U.S. Application Pub. No. 2007/0098198; International Application Pub. No. WO 2005053354 A1; European Application Pub. No. EP 1143766 A1; and Japanese Application JP 2009141879 A.

International Application Pub. No. WO 2017223110 A1 at FIG. 13 and related description discusses upmixing a two channel binaural signal into four channels: left and right channels for both a front binaural signal and a rear binaural signal. As the orientation of the listener's head changes, the front and rear signals are remixed to convert back to a two channel binaural signal for output.

A number of headsets include visual display elements for virtual reality (VR) or augmented reality (AR). Examples include the Oculus Go™ headset and the Microsoft Hololens™ headset.

A number of publications describe signal processing features for binaural audio. Examples include U.S. Application Pub. No. 2014/0334637; U.S. Application Pub. No. 2011/0211702; U.S. Application Pub. No. 2010/0246832; U.S. Application Pub. No. 2006/0083394; and U.S. Application Pub. No. 2004/0062401.

Finally, U.S. Application Pub. No. 2009/0097666 discusses the near-field effect in a speaker array system.

SUMMARY

One problem with many binaural audio systems is that it is often difficult for listeners to perceive front-back differentiation of the binaural outputs.

Given the above problems and lack of solutions, the embodiments described herein are directed toward splitting a binaural signal into multiple binaural signals for output by multiple loudspeakers (e.g., front and rear loudspeaker pairs).

According to an embodiment, a method of rendering audio includes receiving a spatial audio signal, where the spatial audio signal includes position information for rendering audio. The method further includes processing the spatial audio signal to determine a plurality of weights based on the position information. The method further includes rendering the spatial audio signal to form a plurality of rendered signals, where the plurality of rendered signals are amplitude weighted according to the plurality of weights, and where the plurality of rendered signals includes a plurality of binaural signals that are amplitude weighted according to the plurality of weights.

Rendering the spatial audio signal to form the plurality of rendered signals may further include rendering the spatial audio signal to generate an interim rendered signal, and weighting the interim signal according to the plurality of weights to generate the plurality of rendered signals.

The plurality of weights may correspond to a front-back perspective applied to the position information.

Rendering the spatial audio signal to form the plurality of rendered signals may correspond to splitting the spatial audio signal, on an amplitude weighting basis, according to the plurality of weights.

The spatial audio signal may include a plurality of audio objects, where each of the plurality of audio objects is associated with a respective position of the position information. Processing the spatial audio signal may include processing the plurality of audio objects to extract the position information. The plurality of weights may correspond to the respective position of each of the plurality of audio objects.

Each of the plurality of rendered signals may be a binaural signal that includes a left channel and a right channel.

The plurality of rendered signals may include a front signal and a rear signal, where the front signal includes a left front channel and a right front channel, and where the rear signal includes a left rear channel and a right rear channel.

The plurality of rendered signals may include a front signal, a rear signal, and another signal, where the front signal includes a left front channel and a right front channel, where the rear signal includes a left rear channel and a right rear channel, and where the other signal is an unpaired channel.

The method may further include outputting, from a plurality of loudspeakers, the plurality of rendered signals.

The method may further include combining the plurality of rendered signals into a joint rendered signal, generating metadata that relates the joint rendered signal to the plurality of rendered signals, and providing the joint rendered signal and the metadata to a loudspeaker system.

The method may further include generating, by the loudspeaker system, the plurality of rendered signals from the joint rendered signal using the metadata, and outputting, from a plurality of loudspeakers, the plurality of rendered signals.

The method may further include generating headtracking data, and computing, based on the headtracking data, a front delay, a first front set of filter parameters, a second front set of filter parameters, a rear delay, a first rear set of filter parameters, and a second rear set of filter parameters. For a front binaural signal that includes a first channel signal and a second channel signal, the method may further include generating a first modified channel signal by applying the front delay and the first front set of filter parameters to the first channel signal, and generating a second modified channel signal by applying the second front set of filter parameters to the second channel signal. For a rear binaural signal that includes a third channel signal and a fourth channel signal, the method may further include generating a third modified channel signal by applying the second rear set of filter parameters to the third channel signal, and generating a fourth modified channel signal by applying the rear delay and the first rear set of filter parameters to the fourth channel signal. The method may further include outputting, from a first front loudspeaker, the first modified channel signal, outputting, from a second front loudspeaker, the second modified channel signal, outputting, from a first rear loudspeaker, the third modified channel signal, and outputting, from a second rear loudspeaker, the fourth modified channel signal.

According to an embodiment, a non-transitory computer readable medium may store a computer program that, when executed by a processor, controls an apparatus to execute processing including one or more of the method steps described herein.

According to an embodiment, an apparatus for rendering audio includes a processor and a memory. The processor is configured to receive a spatial audio signal, where the spatial audio signal includes position information for rendering audio. The processor is configured to process the spatial audio signal to determine a plurality of weights based on the position information. The processor is configured to render the spatial audio signal to form a plurality of rendered signals, where the plurality of rendered signals are amplitude weighted according to the plurality of weights, and where the plurality of rendered signals includes a plurality of binaural signals that are amplitude weighted according to the plurality of weights.

The apparatus may further include a left front loudspeaker, a right front loudspeaker, a left rear loudspeaker, and a right rear loudspeaker. The left front loudspeaker is configured to output a left channel of a front binaural signal of the plurality of binaural signals. The right front loudspeaker is configured to output a right channel of the front binaural signal. The left rear loudspeaker is configured to output a left channel of a rear binaural signal of the plurality of binaural signals. The right rear loudspeaker is configured to output a right channel of the rear binaural signal. The plurality of weights correspond to a front-back perspective applied to the left front loudspeaker and the left rear loudspeaker, and applied to the right front loudspeaker and the right rear loudspeaker.

The apparatus may further include a mounting structure that is adapted to position the left front loudspeaker, the left rear loudspeaker, the right front loudspeaker, and the right rear loudspeaker around a head of a listener.

The processor being configured to render the spatial audio signal to form the plurality of rendered signals may include the processor rendering the spatial audio signal to generate an interim rendered signal, and weighting the interim signal according to the plurality of weights to generate the plurality of rendered signals.

The processor being configured to render the spatial audio signal to form the plurality of rendered signals may include the processor splitting the spatial audio signal, on an amplitude weighting basis, according to the plurality of weights.

When the spatial audio signal includes a plurality of audio objects, where each of the plurality of audio objects is associated with a respective position of the position information, the processor may be configured configured to process the plurality of audio objects to extract the position information, where the plurality of weights correspond to the respective position of each of the plurality of audio objects.

The apparatus may include further details similar to those described above regarding the method.

The following detailed description and accompanying drawings provide a further understanding of the nature and advantages of various implementations.

DETAILED DESCRIPTION

Described herein are techniques for binaural audio processing. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

Figure 1:
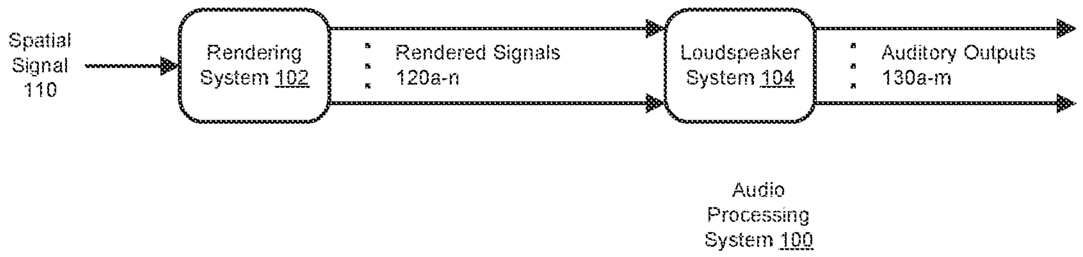
FIG. 1 is a block diagram of an audio processing system 100.

FIG. 1 is a block diagram of an audio processing system 100. The audio processing system 100 includes a rendering system 102 and a loudspeaker system 104. The rendering system 102 receives a spatial audio signal 110 and renders the spatial audio signal 110 to generate a number of rendered signals 120*a*, . . . , 120*n* (collectively, the rendered signals 120). The loudspeaker system 104 receives the rendered signals 120 and generates auditory outputs 130*a*, . . . , 130*m* (collectively, the auditory outputs 130). (When the rendered signals 120 are binaural signals, each of the auditory outputs 130 corresponds to two channels of one of the rendered signals 120, so m is twice n.)

In general, the spatial audio signal 110 includes position information, and the rendering system 102 uses the position information when generating the rendered signals 120 in order for a listener to perceive the audio as originating from the various positions indicated by the position information. The spatial audio signal 110 may include audio objects, such as in the Dolby Atmos™ system or the DTS:X™ system. The spatial audio signal 110 may include B-format signals (e.g., using four component channels: W for the sound pressure, X for the front-minus-back sound pressure gradient, Y for left-minus-right, and Z for up-minus-down), such as in the Ambisonics™ system. The spatial audio signal 110 may be a surround sound signal, such as a or 7.1-channel stereo signal. For channel signals (such as 5.1-channel), each channel may be assigned to a defined position, and may be referred to as bed channels. For example, the left bed channel may be provided to the left loudspeaker, etc.

According to an embodiment, the rendering system 102 generates the rendered signals 120 corresponding to front and rear binaural signals, each with left and right channels; and the loudspeaker system 104 includes four speakers that respectively output a left front channel, a right front channel, a left rear channel, and a right rear channel. Further details of the rendering system 102 and the loudspeaker system 104 are provided below.

Figure 2A:
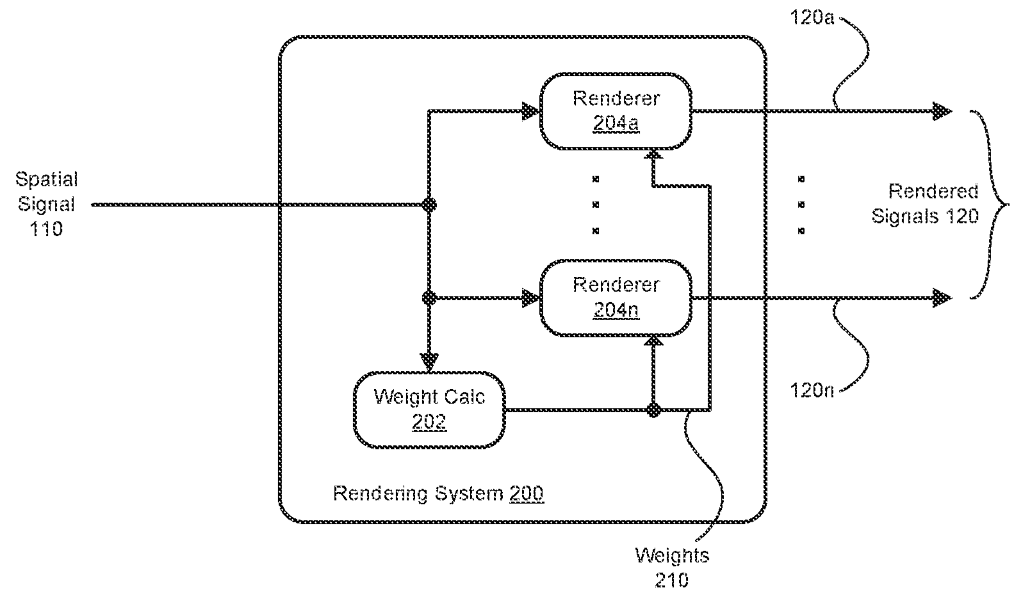
FIG. 2A is a block diagram of a rendering system 200.

FIG. 2A is a block diagram of a rendering system 200. The rendering system 200 may be used as the rendering system 102 (see FIG. 1). The rendering system 200 includes a weight calculator 202 and a number of renderers 204*a*, . . . , 204*n* (collectively, the renderers 204). The weight calculator 202 receives the spatial audio signal 110 and calculates a number of weights 210 based on the position information in the spatial audio signal 110. The weights 210 correspond to a front-back perspective applied to the position information. The renderers 204 render the spatial audio signal 110 using the weights 210 to generate the rendered signals 120. In general, the renderers 204 use the weights 210 to perform amplitude weighting of the rendered signals 120. In effect, the renderers 204 use the weights 210 to split the spatial signal 110 on an amplitude weighting basis when generating the rendered signals 120.

For example, an embodiment of the rendering system 200 includes two renderers 204 (e.g., a front renderer and a rear renderer) that respectively render a front binaural signal and a rear binaural signal (collectively forming the rendered signals 120). When the position information of a particular object indicates the sound is exclusively in the front, the weights 120 may be 1.0 provided to the front renderer, and 0.0 provided to the rear renderer, for that particular object. When the position information indicates the sound is exclusively in the rear, the weights 120 may be 0.0 provided to the front renderer, and 1.0 provided to the rear renderer, for that particular object. When the position information indicates the sound is exactly between the front and the rear, the weights 120 may be 0.5 provided to the front renderer, and 0.5 provided to the rear renderer, for that particular object. When the position information is otherwise between the front and the rear, the weights 120 may be similarly apportioned between the front renderer and the rear renderer, for that particular object. The weights 120 may be apportioned in an energy preserving manner; for example, when the position information indicates the sound is exactly between the front and the rear, the weights 120 may be 1/sqrt(2) provided to the front renderer, and 1/sqrt(2) provided to the rear renderer, for that particular object.

Figure 2B:
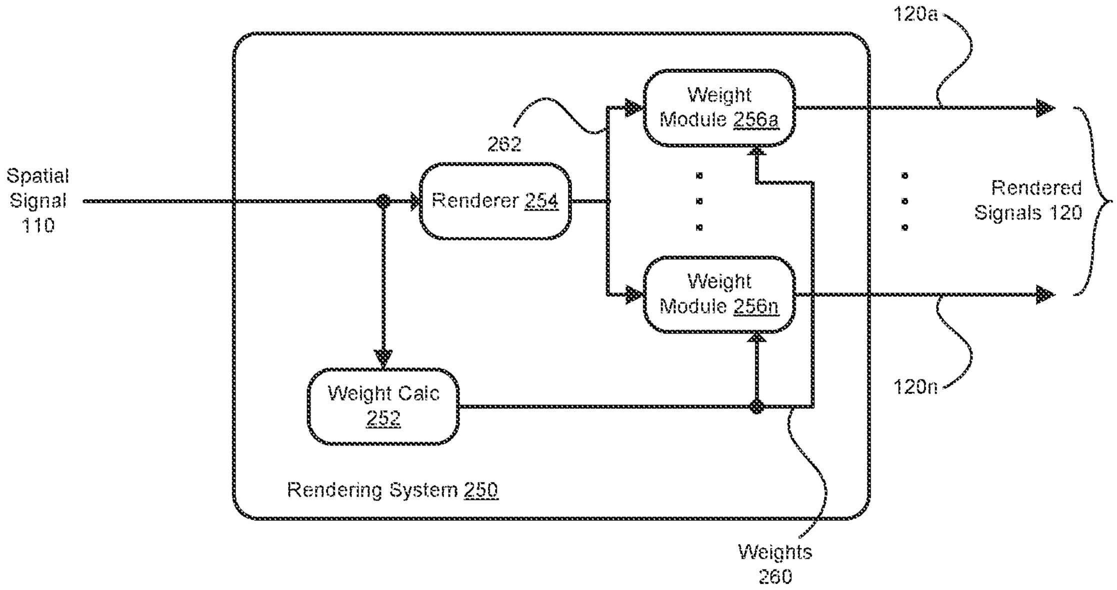
FIG. 2B is a block diagram of a rendering system 250.

FIG. 2B is a block diagram of a rendering system 250. The rendering system 250 may be used as the rendering system 102 (see FIG. 1). The rendering system 250 includes a weight calculator 252, a renderer 254, and a number of weight modules 256*a*, . . . , 256*n* (collectively, the weight modules 256). The weight calculator 252 receives the spatial audio signal 110 and calculates a number of weights 260 based on the position information in the spatial audio signal 110, similarly to the weight calculator 202 (see FIG. 2A). The renderer 254 renders the spatial audio signal 110 to generate an interim rendered signal 262. When the spatial audio signal 110 includes multiple audio objects (or multiple channels) that are to be output at the same time, the renderer 254 may process each audio object (or channel) concurrently, for example by assigning processing time shares. The weight modules 256 apply the weights 260 to the interim rendered signal 262 (on a per-object or per-channel basis) to generate the rendered signals 120. Similarly to the rendering system 200 (see FIG. 2A), the weights 260 correspond to a front-back perspective applied to the position information, and the weight modules 256 use the weights 260 to perform amplitude weighting of the interim rendered signal 262.

For example, an embodiment of the rendering system 250 includes two weight modules 256 (e.g., a front weight module and a rear weight module) that respectively generate a front binaural signal and a rear binaural signal (collectively forming the rendered signals 120), in a manner similar to that described above regarding the weight calculator 202 (see FIG. 2A).

An example of calculating the weights (210 in FIG. 2A or 260 in FIG. 2B) using Cartesian coordinates is as follows. Given an audio object positioned at a normalized direction V(x,y,z) (with x,y,z values in the range [−1,1]) around the head (assuming the head is (0,0,0)) and assuming the positive y-axis is the front direction, the front weight W1=0.5+0.5*cos(y) may be used to weight the binaural signal sent to the front speaker pair, and the rear weight W2=sqrt(1−W1*W1) can be used for the back speaker pair. In the case of a Dolby Atmos™ presentation where the object's y coordinate in [0,1] correspond to a front/back ratio, W1=cos(y*pi/2) and W2=sin(y*pi/2) may be used.

Continuing the example, further assume four loudspeakers arranged on the front left, the front right, the rear left, and the rear right. The renderer 254 (see FIG. 2B) convolves the audio object signal (e.g., 110) using a left head related transfer function (HRTF) and a right HRTF to generate a left interim rendered signal (e.g., 262) and a right interim rendered signal. The weight modules 256 apply the front weight W1 (e.g., 260) to the left interim rendered signal to generate the rendered signal (e.g., 120*a*) for the front left loudspeaker; the front weight W1 to the right interim rendered signal to generate the rendered signal for the front right loudspeaker; the rear weight W2 to the left interim rendered signal to generate the rendered signal for the rear left loudspeaker; and the rear weight W2 to the right interim rendered signal to generate the rendered signal for the rear right loudspeaker.

Continuing the example for a second audio object, the renderer 254 generates a left interim rendered signal and a right interim rendered signal for the signal of the second audio object. The weight modules 256 apply the front weight W1 and the rear weight W2 as described above, to generate the rendered signals for the loudspeakers that now include the weighted audio of both audio objects.

For B-format signals (e.g., first order Ambisonics™ or higher order Ambisonics™), the rendering system (e.g., the rendering system 250 of FIG. 2B) may generate a virtual microphone pattern/beam (e.g. cardioid) to first obtain a front and back signals that can be binaurally rendered and sent to the front and back loudspeaker pairs. In such a case, the weighting is achieved by this virtual 'beamforming' process.

For multiple pairs of speakers, a similar approach may be used where cosine lobes pointing towards the direction of each near-field speaker may be used to obtain different input signals or weights suitable for each binaural pair. Generally higher order lobes would be used as the number of speaker pairs increases in a way similar to a higher order Ambisonics™ stream may be decoded on a traditional sound speaker system.

For example, consider four loudspeakers arranged on the front left, the front right, the rear left, and the rear right. Further consider that the spatial audio signal 110 is a B-format signal having M basis signals (e.g., 4 basis signals w, x, y, z). The renderer 254 (see FIG. 2B) receives the M basis signals and performs a binaural rendering to result in 2M interim rendered signals (e.g., a 2×4 matrix of left and right rendered signals for each of the 4 basis signals). The weight modules 256 implement a weight matrix W of size 2M×4 to generate the four output signals to the two speaker pairs. In effect, the weight matrix W performs the 'beamforming' and plays the same role as the weights in the audio object example discussed in the earlier paragraphs.

In summary, for both the audio object case and the B-format case, the rendering of the input signal to binaural need only happen once per object (or soundfield basis signal); the matrixing/beamforming to generate the loudspeaker outputs is an additional matrixing/linear combination operation.

Figure 3:
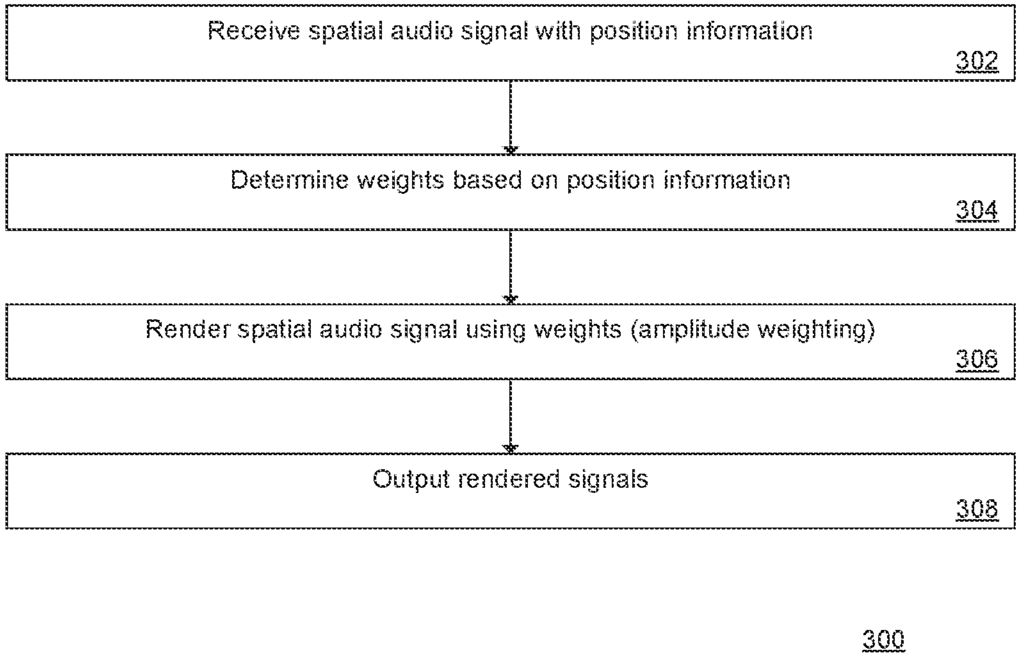
FIG. 3 is a flowchart of a method 300 of rendering audio.

FIG. 3 is a flowchart of a method 300 of rendering audio. The method 300 may be performed by the audio processing system 100 (see FIG. 1), by the rendering system 102 (see FIG. 2), etc. The method 300 may be implemented by to one or more computer programs that are stored or executed by one or more hardware devices.

At 302, a spatial audio signal is received. The spatial audio signal includes position information for rendering audio. For example, the rendering system 200 (see FIG. 2A) or the rendering system 250 (see FIG. 2B) may receive the spatial audio signal 110.

At 304, the spatial audio signal is processed to determine a number of weights based on the position information. For example, the weight calculator 202 (see FIG. 2A) may determine the weights 210 based on the position information in the spatial audio signal 110. As another example, the weight calculator 252 (see FIG. 2B) may determine the weights 260 based on the position information in the spatial audio signal 110.

At 306, the spatial audio signal is rendered to form a number of rendered signals. The rendered signals are amplitude weighted according to the weights. The rendered signals may include a number of binaural signals that are amplitude weighted according to the weights. As discussed above, generally speaking, these weights may be explicitly based on the x,y,z position of objects, so the system may binauralize each object and then send it to different pairs of speakers with appropriate weights. Alternatively, these weights may be implicitly part of the beamforming pattern. Then several input signals are obtained that can be individually binauralized and sent to their appropriate speaker pairs.

For example, the renderers 204 (see FIG. 2A) may render the spatial audio signal 110 to form the rendered signals 120. Each of the renderers 204 may use, for a particular audio object, a respective one of the weights 210 to perform amplitude weighting when generating its corresponding one of the rendered signals 120. One or more of the renderers 204 may be binaural renderers. According to an embodiment, the renderers 204 include a front binaural renderer and a rear binaural renderer, and the rendered signals 120 include a front binaural signal and a rear binaural signal resulting from rendering one or more audio objects, that have been amplitude weighted according to the weights 210, on a front-back perspective applied to the position information.

As another example, the renderer 254 (see FIG. 2B) renders the spatial audio signal 110 to form the interim rendered signal 262, to which the weight modules 256 apply the weights 260 to form the rendered signals 120. The renderer 254 may be a binaural renderer, and the weight modules 256 may generate a front binaural signal and a rear binaural signal, using the weights 260 to apply a front-back perspective to the interim rendered signal 262.

At 308, a number of loudspeakers output the rendered signals. For example, the loudspeaker system 104 (see FIG. 1) may output the rendered signals 120 as the auditory outputs 130.

Figure 4:
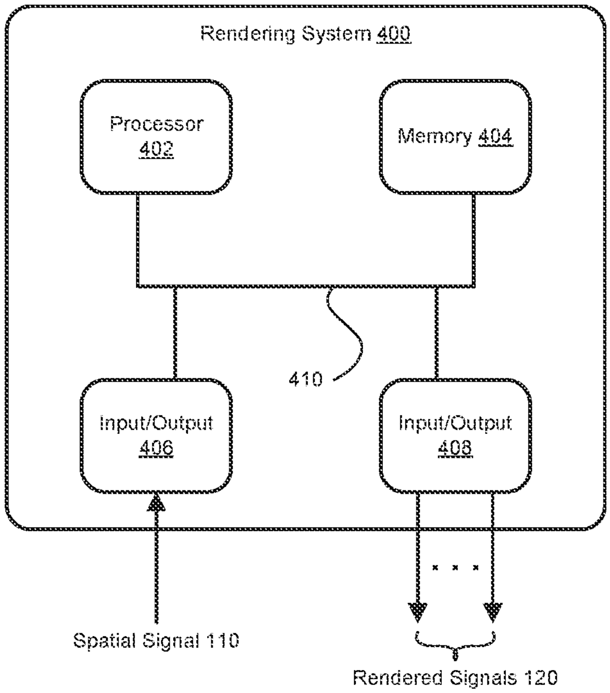
FIG. 4 is a block diagram of a rendering system 400.

FIG. 4 is a block diagram of a rendering system 400. The rendering system 400 includes hardware details for implementing the functions of the rendering system 200 (see FIG. 2A) or the rendering system 250 (see FIG. 2B). The rendering system 400 may implement the method 300 (see FIG. 3), for example by executing one or more computer programs. The rendering system 400 includes a processor 402, a memory 404, an input/output interface 406, and an input/output interface 408. A bus 410 connects these components. The rendering system 400 may include other components that (for brevity) are not shown.

The processor 402 generally controls the operation of the rendering system 400. The processor 402 may execute one or more computer programs in order to implement the functions of the rendering system 200 (see FIG. 2A), including the weight calculator 202 and the renderers 204. Likewise, the processor 402 may implement the functions of the rendering system 250 (see FIG. 2B), including the weight calculator 252, the renderer 254 and the weight modules 256. The processor 402 may include, or be a component of, a programmable logic device or digital signal processor.

The memory 404 generally stores the data operated on by the processor 402, such as digital representations of the signals shown in FIGS. 2A-2B such as the spatial audio signal 110, the position information, the weights 210 or 260, the interim rendered signal 262, and the rendered signals 120. The memory 404 may also store any computer programs executed by the processor 402. The memory 404 may include volatile or non-volatile components.

The input/output interfaces 406 and 408 generally interface the rendering system 400 with other components. The input/output interface 406 interfaces the rendering system 400 with the provider of the spatial audio signal 110. If the spatial audio signal 110 is stored locally, the input/output interface 406 may communicate with that local component. If the spatial audio signal 110 is received from a remote component, the input/output interface 406 may communicate with that remote component via a wired or wireless connection.

The input/output interface 408 interfaces the rendering system 400 with the loudspeaker system 104 (see FIG. 1) to provide the rendered signals 120. If the loudspeaker system 104 and the rendering system 102 (see FIG. 1) are components of a single device, the input/output interface 408 provides a physical interconnection between the components. If the loudspeaker system 104 is a separate device from the rendering system 102, the input/output interface 408 may provide an interface for a wired or wireless connection (e.g., IEEE 802.15.1 connection).

Figure 5:
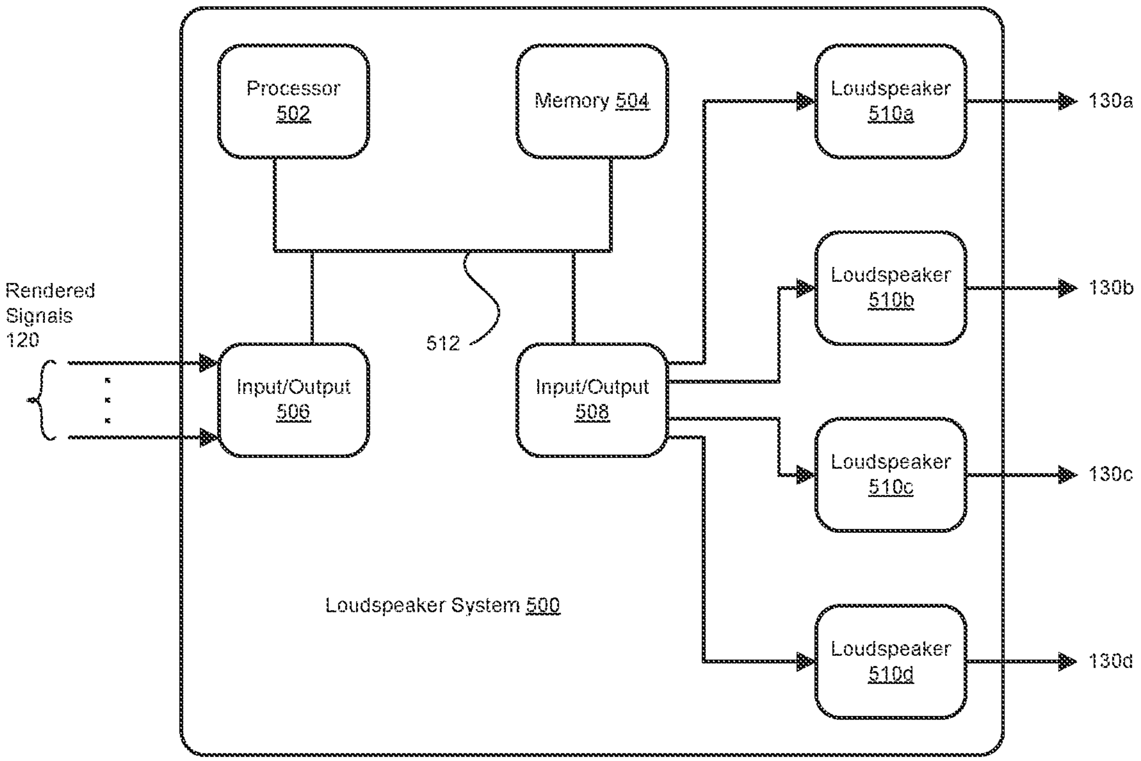
FIG. 5 is a block diagram of a loudspeaker system 500.

FIG. 5 is a block diagram of a loudspeaker system 500. The loudspeaker system 500 includes hardware details for implementing the functions of the loudspeaker system 104 (see FIG. 1). The loudspeaker system 500 may implement 308 of the method 300 (see FIG. 3), for example by executing one or more computer programs. The loudspeaker system 500 includes a processor 502, a memory 504, an input/output interface 506, an input/output interface 508, and a number of loudspeakers 510 (4 shown, 510*a*, 510*b*, 510*c* and 510*d*). (Alternatively, a simplified version of the loudspeaker system 500 may omit the processor 502 and the memory 504, e.g. when the rendering system 102 and the loudspeaker system 104 are components of a single device.) A bus 512 connects the processor 502, the memory 504, the input/output interface 506, and the input/output interface 508. The loudspeaker system 500 may include other components that (for brevity) are not shown.

The processor 502 generally controls the operation of the loudspeaker system 500, for example by executing one or more computer programs. The processor 502 may include, or be a component of, a programmable logic device or digital signal processor.

The memory 504 generally stores the data operated on by the processor 502, such as digital representations of the rendered signals 120. The memory 504 may also store any computer programs executed by the processor 502. The memory 504 may include volatile or non-volatile components.

The input/output interface 506 interfaces the loudspeaker system 500 with the rendering system 102 (see FIG. 1) to receive the rendered signals 120. The input/output interface 506 may provide an interface for a wired or wireless connection (e.g., IEEE 802.15.1 connection). According to an embodiment, the rendered signals 120 include a front binaural signal and a rear binaural signal.

The input/output interface 508 interfaces the loudspeakers 510 with the other components of the loudspeaker system 500.

The loudspeakers 510 generally output the auditory signals 130 (4 shown, 130*a*, 130*b*, 130*c* and 130*d*) that correspond to the rendered signals 120. According to an embodiment, the rendered signals 120 include a front binaural signal and a rear binaural signal; the loudspeaker 510*a* outputs a left channel of the front binaural signal, the loudspeaker 510*b* outputs a right channel of the front binaural signal, the loudspeaker 510*c* outputs a left channel of the rear binaural signal, and the loudspeaker 510*d* outputs a right channel of the rear binaural signal.

Since the rendered signals 120 have been weighted based on a front-back perspective applied to the position information in the spatial signal 110 (as discussed above regarding the rendering system 102), the loudspeakers 510*a*-510*b* output the left and right channels of the weighted front binaural signal, and the loudspeakers 510*c*-510*d* output the left and right channels of the weighted rear binaural signal. In this manner, the audio processing system 100 (see FIG. 1) improves the front-back differentiation perceived by a listener.

Figure 6A:
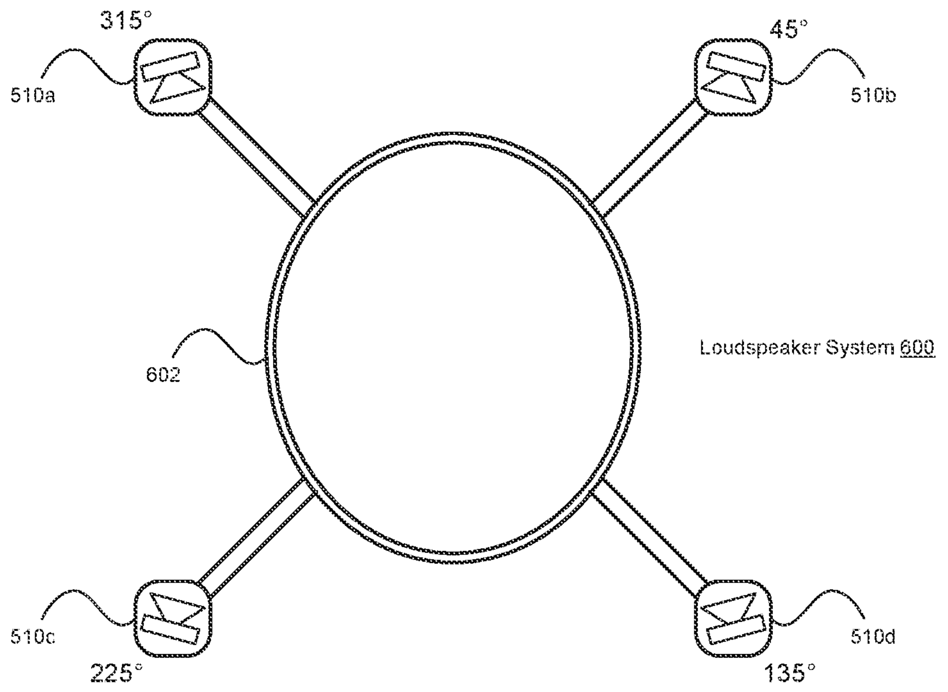
FIG. 6A is a top view of a loudspeaker system 600.

FIG. 6A is a top view of a loudspeaker system 600. The loudspeaker system 600 corresponds to a specific implementation of the loudspeaker system 104 (see FIG. 1) or the loudspeaker system 500 (see FIG. 5). The loudspeaker system 600 includes a mounting structure 602 that positions the loudspeakers 510*a*, 510*b*, 510*c* and 510*d* around the head of a listener. The arms of the loudspeakers 510*a*, 510*b*, 510*c* and 510*d* are positioned 90 degrees apart, at 45 degrees, 135 degrees, 225 degrees, and 315 degrees (relative to the center of the listener's head, with 0 degrees being the listener's front); the loudspeakers themselves may each be angled toward the left ear or right ear of the listener. The loudspeakers 510*a*, 510*b*, 510*c* and 510*d* are typically positioned close to the listener's head (for example, 6 inches away). The loudspeakers 510*a*, 510*b*, 510*c* and 510*d* are typically low power, e.g. between 1 and 10 Watts. Given the proximity to the head and the low power, the outputs of the loudspeakers 510*a*, 510*b*, 510*c* and 510*d* are considered near-field outputs. Near-field outputs have negligible cross-talk interference between the left and right sides of the loudspeakers, so cross-talk cancellation may be omitted in some instances. In addition, the loudspeakers 510*a*, 510*b*, 510*c* and 510*d* do not obscure the ears of the listener, which allows the listener to also hear ambient sounds and makes the loudspeaker system 600 suitable for augmented reality applications.

Figure 6B:
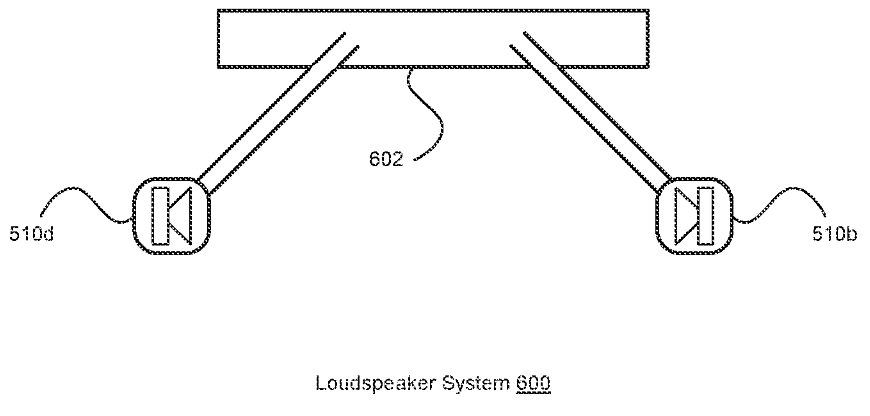
FIG. 6B is a right side view of the loudspeaker system 600.

FIG. 6B is a right side view of the loudspeaker system 600 (see FIG. 6A), showing the mounting structure 602, the loudspeaker 510*b* and the loudspeaker 510*d*. When the helmet structure 602 is placed on the head of a listener, the loudspeakers 510*b* and 510*d* are horizontally aligned with the listener's right ear. The helmet structure 602 may include a solid cap area, straps, etc. for ease of attachment, use and comfort of the wearer.

The configurations of the loudspeakers in the loudspeaker system 600 may be varied as desired. For example, the angular separation of the loudspeakers may be adjusted to be greater than, or less than, 90 degrees. As another example, the angle of the front loudspeakers may be other than 45 and 315 degrees (e.g., 30 and 330 degrees). As a further example, the angle of the rear loudspeakers may be varied to be other than 135 and 225 degrees (e.g., 145 and 235 degrees).

The elevations of the loudspeakers in the loudspeaker system 600 may also be varied. For example, the loudspeakers may be increased, or decrease, in elevation from the elevations shown in FIG. 6B.

The quantities of the loudspeakers in the loudspeaker system 600 may also be varied. For example, a center loudspeaker may be added between the front loudspeakers 510*a* and 510*b*. Since this center loudspeaker outputs an unpaired channel, its corresponding renderer 204 (see FIG. 2A) is not a binaural renderer.

Figure 7A:
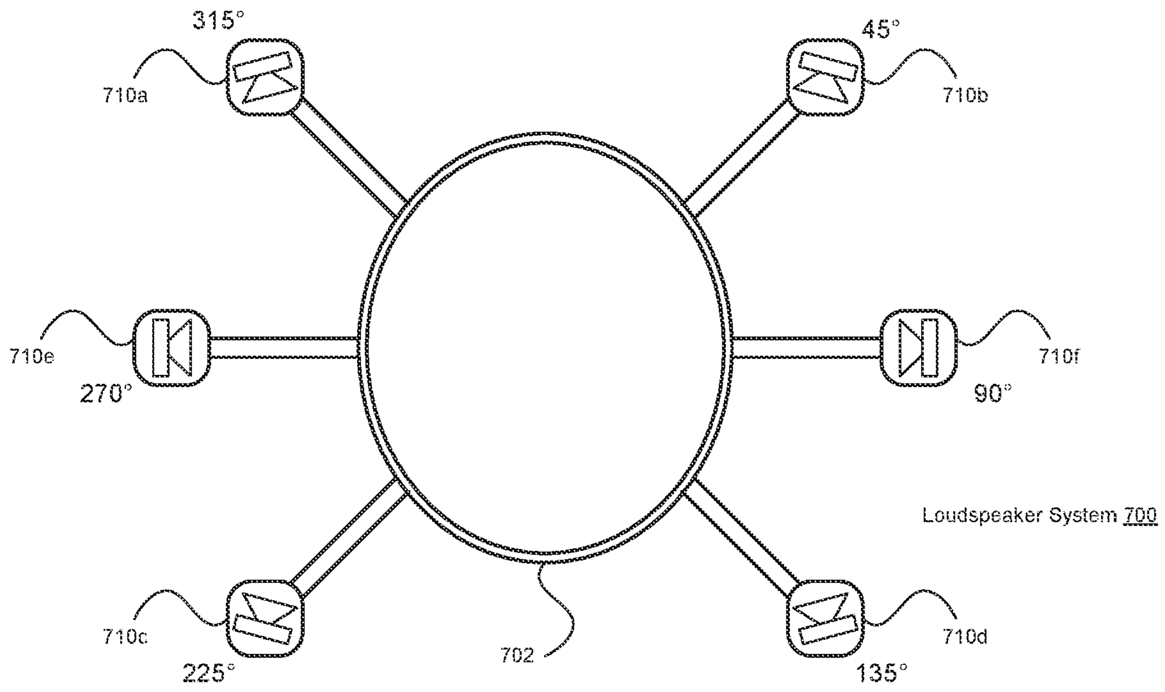
FIG. 7A is a top view of a loudspeaker system 700.
Figure 7B:
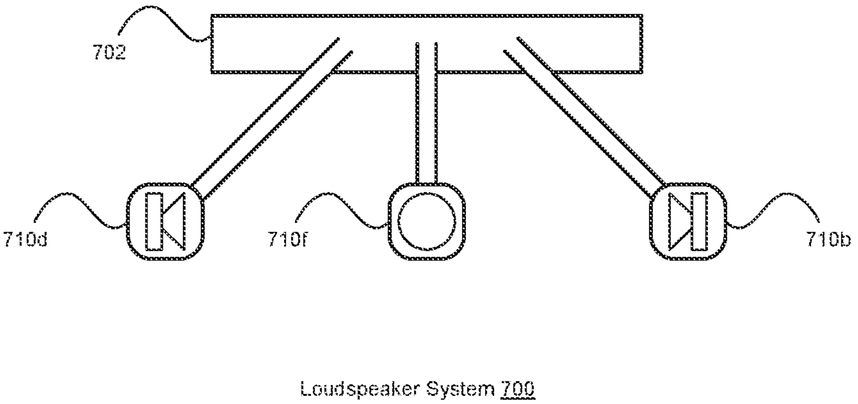
FIG. 7B is a right side view of the loudspeaker system 700.

Another option for varying the number of loudspeakers is discussed with regard to FIGS. 7A-7B.

FIG. 7A is a top view of a loudspeaker system 700. The loudspeaker system 700 corresponds to a specific implementation of the loudspeaker system 104 (see FIG. 1) or the loudspeaker system 500 (see FIG. 5). The loudspeaker system 700 includes a helmet structure 702 and loudspeakers 710*a*, 710*b*, 710*c*, 710*d*, 710*e* and 710*f* (collectively the loudspeakers 710). The helmet structure 702 positions the loudspeakers 710*a*, 710*b*, 710*c*, 710*d* similarly to the loudspeakers 510*a*, 510*b*, 510*c* and 510*d* (see FIG. 6A). The helmet structure 702 positions the loudspeaker 710*e* adjacent to the listener's left ear (e.g., at 270 degrees), and positions the loudspeaker 710*f* adjacent to the listener's right ear (e.g., at 90 degrees).

FIG. 7B is a right side view of the loudspeaker system 700 (see FIG. 7A), showing the helmet structure 702 and the loudspeakers 710*b*, 710*d* and 710*f*.

The configurations, positions, angles, quantities, and elevations of the loudspeakers 710 may be varied as desired, similar to the options discussed regarding the loudspeaker 600 (see FIGS. 6A-6B).

Visual Display Options

Embodiments may include a visual display to provide visual VR or AR aspects. For example, the loudspeaker system 600 (see FIGS. 6A-6B) may add a visual display system in the form of goggles or a display screen at the front of the helmet structure 602. In such an embodiment, the front loudspeakers 510*a* and 510*b* may be attached to the front sides of the visual display system.

As with the other options described above, the configurations, positions, angles, quantities, and elevations of the loudspeakers may be varied as desired.

Metadata and Binaural Coding Options

As an alternative to sending separate rendered signals from the rendering system to the loudspeaker system (e.g., as shown in FIGS. 1-2 and 4-5), the rendering system may combine the rendered signals 120 into a combined rendered signal with side chain metadata; the loudspeaker system uses the side chain metadata to un-combine the combined rendered signal into the individual rendered signals 120. Further details are provided with reference to FIGS. 8-9.

Figure 8A:
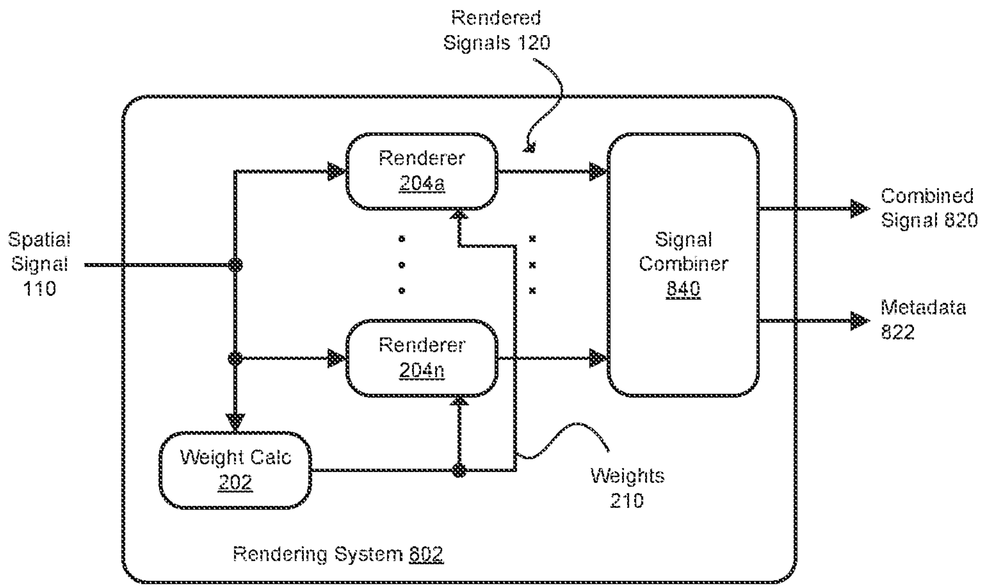
FIG. 8A is a block diagram of a rendering system 802.

FIG. 8A is a block diagram of a rendering system 802. The rendering system 802 is similar to the rendering system 200 (see FIG. 2A, including the weight calculator 202 and the renderers 204), with the addition of a signal combiner 840. The signal combiner 840 combines the rendered signals 120 to form a combined signal 820, and generates metadata 822 that describes how the rendered signals 120 have been combined.

This process of combining may also be referred to as upmixing or forming a joint signal. According to an embodiment, the metadata 822 includes front-back amplitude ratios of the left and right channels in various frequency bands (e.g., on a quadrature minor filter (QMF) sub-band basis).

The rendering system 802 may be implemented by components similar to those described above regarding the rendering system 400 (see FIG. 4).

Figure 8B:
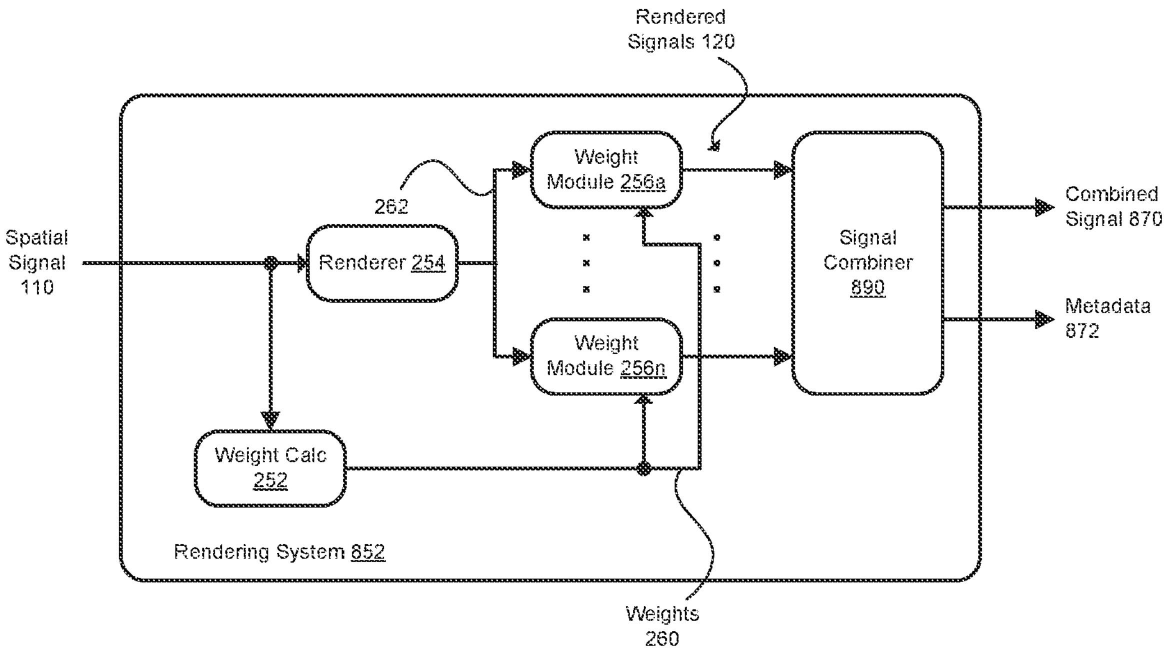
FIG. 8B is a block diagram of a rendering system 852.

FIG. 8B is a block diagram of a rendering system 852. The rendering system 802 is similar to the rendering system 250 (see FIG. 2B, including the weight calculator 252, the renderer 254 and the weight modules 256), with the addition of a signal combiner 890. The signal combiner 890 combines the rendered signals 120 to form a combined signal 870, and generates metadata 872 that describes how the rendered signals 120 have been combined. The signal combiner 890, and the rendering system 852, are otherwise similar to the signal combiner 840 and the rendering system 802 (see FIG. 8A).

Figure 9:
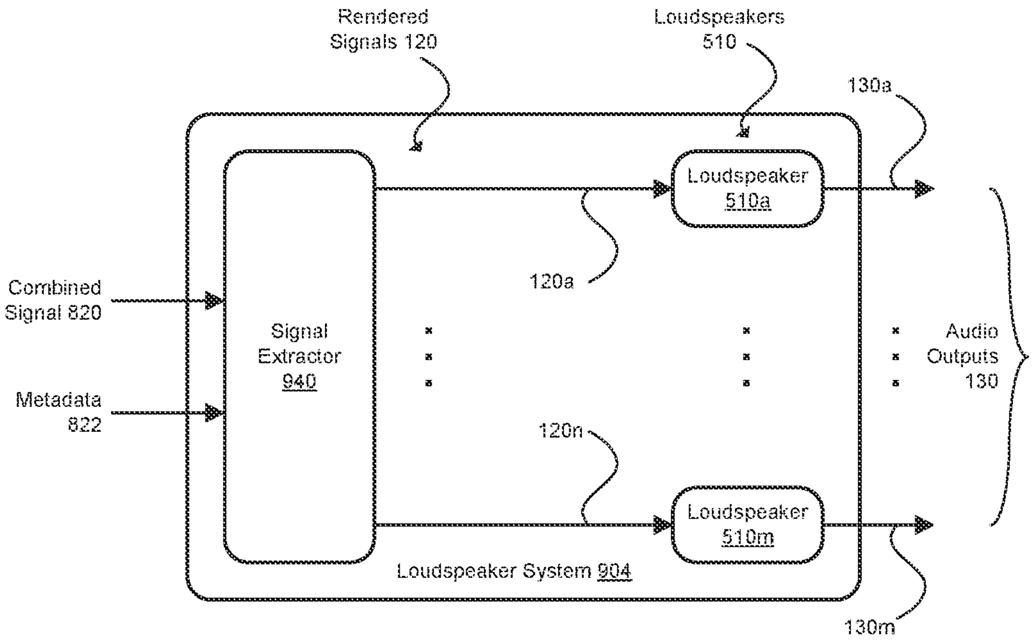
FIG. 9 is a block diagram of a loudspeaker system 904.

FIG. 9 is a block diagram of a loudspeaker system 904. The loudspeaker system 904 is similar to the loudspeaker system 104 (see FIG. 1, including the loudspeakers 510 as shown in FIG. 5), with the addition of a signal extractor 940. The signal extractor 940 receives the combined signal 820 and the metadata 822 (see FIG. 8A), and uses the metadata 822 to generate the rendered signals 120 from the combined signal 820. The loudspeaker system 904 then outputs the rendered signals 120 from its loudspeakers as the auditory outputs 130, as discussed above.

The loudspeaker system 904 may be implemented by components similar to those described above regarding the loudspeaker system 500 (see FIG. 5).

Headtracking Options

As mentioned above, the audio processing system 100 (see FIG. 1) may include headtracking.

Figure 10:
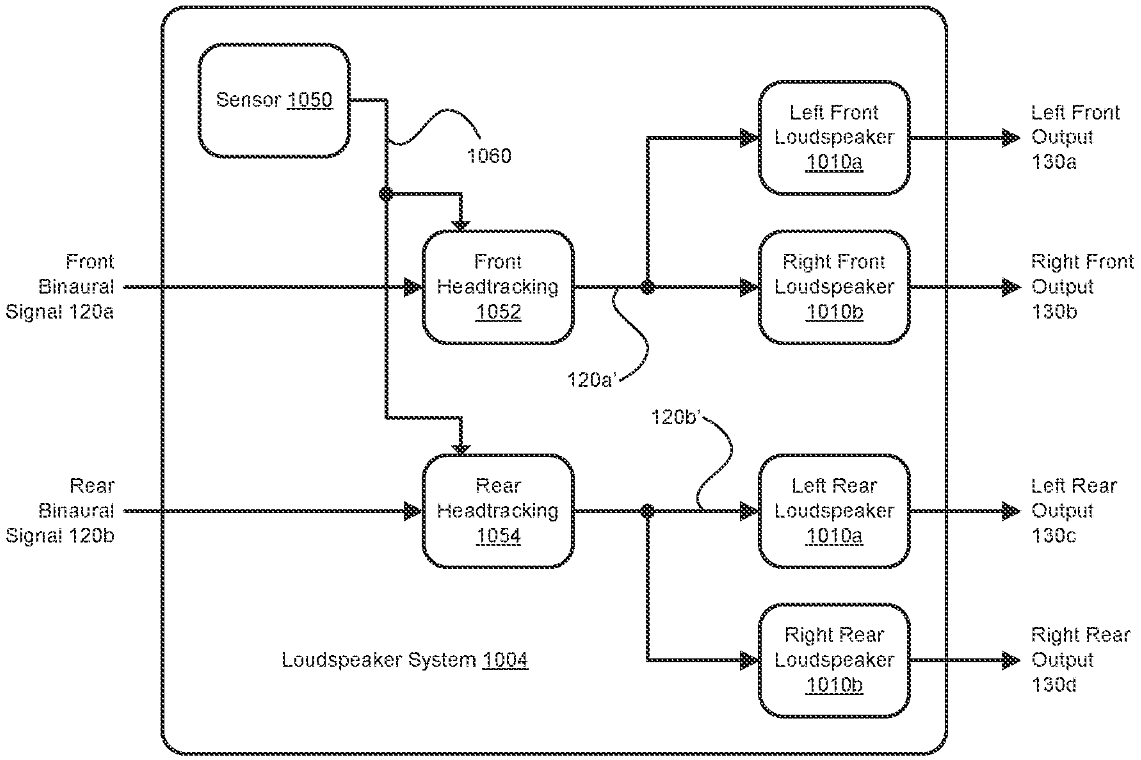
FIG. 10 is a block diagram of a loudspeaker system 1004 that implements headtracking.

FIG. 10 is a block diagram of a loudspeaker system 1004 that implements headtracking. The loudspeaker system 1004 includes a sensor 1050, a front headtracking system 1052, a rear headtracking system 1054, a left front loudspeaker 1010*a*, a right front loudspeaker 1010*b*, a left rear loudspeaker 1010*c*, and a right rear loudspeaker 1010*d*. The loudspeaker system 1004 receives two rendered signals 120 (see, e.g., FIG. 2A or FIG. 2B), which are referred to as a front binaural signal 120*a* and a rear binaural signal 120*b*; each include left and right channels. The loudspeaker system 1004 generates four auditory outputs 130, which are referred to as a left front auditory output 130*a*, a right front auditory output 130*b*, a left rear auditory output 130*c*, and a right rear auditory output 130*d*.

The sensor 1050 detects the orientation of the loudspeaker system 1004 and generates headtracking data 1060 that corresponds to the detected orientation. The sensor 1050 may be an accelerometer, a gyroscope, a magnetometer, an infrared sensor, a camera, a radio frequency link, or any other type of sensor that allows for headtracking. The sensor 1050 may be a multi-axis sensor. The sensor 1050 may be one of a number of sensors that generate the headtracking data 1060 (e.g., one sensor generates azimuthal data, another sensor generates elevational data, etc.).

The front headtracking system 1052 modifies the front binaural signal 120*a* according to the headtracking data 1060 to generate a modified front binaural signal 120*a*'. In general, the modified front binaural signal 120*a*' corresponds to the front binaural signal 120*a*, but modified so that the listener perceives the front binaural signal 120*a* according to the changed orientation of the loudspeaker system 1004.

The rear headtracking system 1054 modifies the rear binaural signal 120*b* according to the headtracking data 1060 to generate a modified rear binaural signal 120*b*'. In general, the modified rear binaural signal 120*b*' corresponds to the rear binaural signal 120*b*, but modified so that the listener perceives the rear binaural signal 120*b* according to the changed orientation of the loudspeaker system 1004.

Figure 11:
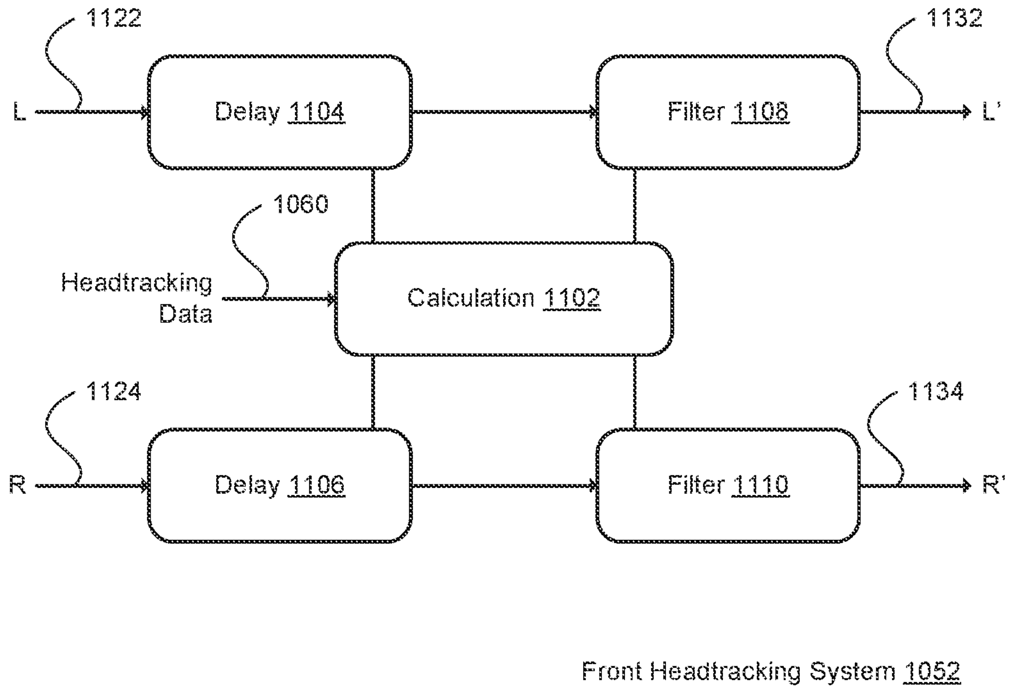
FIG. 11 is a block diagram of the front headtracking system 1052 (see FIG. 10).

Further details of the front and rear headtracking systems 1052 and 1054 are provided with reference to FIG. 11.

The left front loudspeaker 1010*a* outputs a left channel of the modified front binaural signal 120*a*' as the left front auditory output 130*a*. The right front loudspeaker 1010*b* outputs a right channel of the modified front binaural signal 120*a*' as the right front auditory output 130*b*. The left rear loudspeaker 1010*c* outputs a left channel of the modified rear binaural signal 120*b*' as the left rear auditory output 130*c*. The right rear loudspeaker 1010*d* outputs a right channel of the modified rear binaural signal 120*b*' as the right rear auditory output 130*d*.

As with the other embodiments described above, the configurations, positions, angles, quantities, and elevations of the loudspeakers in the loudspeaker system 1004 may be varied as desired.

FIG. 11 is a block diagram of the front headtracking system 1052 (see FIG. 10). The front headtracking system 1052 includes a calculation block 1102, a delay block 1104, a delay block 1106, a filter block 1108, and a filter block 1110. The front headtracking system 1052 receives as inputs the headtracking data 1060, an input left signal L 1122, and an input right signal R 1124. (The signals 1122 and 1124 correspond to left and right channels of the front binaural signal 120*a*.) The front headtracking system 1052 generates as outputs an output left signal L' 1132 and an output right signal R' 1134. (The signals 1132 and 1134 correspond to left and right channels of the modified front binaural signal 120*a*'.)

The calculation block 1102 generates a delay and filter parameters based on the headtracking data 1060, provides the delay to the delay blocks 1104 and 1106, and provides the filter parameters to the filter blocks 1108 and 1110. The filter coefficients may be calculated according to the Brown-Duda model (see C. P. Brown and R. O. Duda, "An efficient HRTF model for 3-D sound", in WASPAA '97 (1997 IEEE ASSP Workshop on Applications of Signal Processing to Audio and Acoustics, Mohonk Mountain House, New Paltz, NY, October 1997)), and the delay values may be calculated according to the Woodworth approximation (see R. S. Woodworth and G. Schlosberg, Experimental Psychology, pp. 349-361 (Holt, Rinehart and Winston, NY, 1962)), or any corresponding system of inter-aural level and time difference.

The delay block 1104 applies the appropriate delay to the input left signal L 1122, and the delay block 1106 applies the appropriate delay to the input right signal R 1124. For example, a leftward turn provides a delay D1 to the delay block 1104, and zero delay to the delay block 1106. Similarly, a rightward turn provides zero delay to the delay block 1104, and a delay D2 to the delay block 1106.

The filter block 1108 applies the appropriate filtering to the delayed signal from the delay block 1104, and the filter block 1110 applies the appropriate filtering to the delayed signal from the delay block 1106. The appropriate filtering will be either ipsilateral filtering (for the "near" ear) or contralateral filtering (for the "far" ear), depending upon the headtracking data 1060. For example, for a leftward turn, the filter block 1108 applies a contralateral filter, and the filter block 1110 applies an ipsilateral filter. Similarly, for a rightward turn, the filter block 1108 applies an ipsilateral filter, and the filter block 1110 applies a contralateral filter.

The rear headtracking system 1054 may be implemented similarly to the front headtracking system 1052. Differences include operating on the rear binaural signal 120*b* (instead of on the front binaural signal 120*a*), and inverting the headtracking data 1060 from that used by the front headtracking system 1052. For example, when the headtracking data 1060 indicates a leftward turn of 30 degrees (+30 degrees), the front headtracking system 1052 uses (+30 degrees) for its processing, and the rear headtracking system 1054 inverts the headtracking data 1060 as (−30 degrees) for its processing. Another difference is that the delay and the filter coefficients for the rear are slightly different from those for the front. In any event, the front headtracking system 1052 and the rear headtracking system 1054 may share the calculation block 1102.

The details of the headtracking operations may otherwise be similar to those described in International Application Pub. No. WO 2017223110 A1.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of rendering a spatial audio signal, the method comprising:

receiving the spatial audio signal, wherein the spatial audio signal includes position information for rendering;

determining a plurality of weights based on the position information;

rendering the spatial audio signal to form a plurality of rendered signals, wherein the plurality of rendered signals are amplitude weighted according to the plurality of weights;

combining the plurality of rendered signals into a joint rendered signal;

generating metadata that relates the joint rendered signal to the plurality of rendered signals; and providing the joint rendered signal and the metadata to a loudspeaker system.

2. The method of claim 1, wherein rendering the spatial audio signal to form the plurality of rendered signals comprises:

rendering the spatial audio signal to generate an interim rendered signal; and weighting the interim signal according to the plurality of weights to generate the plurality of rendered signals.

3. The method of claim 1, wherein the plurality of weights correspond to a front-back perspective applied to the position information.

4. The method of claim 1, wherein rendering the spatial audio signal to form the plurality of rendered signals corresponds to splitting the spatial audio signal, on an amplitude weighting basis, according to the plurality of weights.

5. The method of claim 1, wherein the spatial audio signal includes a plurality of audio objects, wherein each of the plurality of audio objects is associated with a respective position of the position information;

wherein processing the spatial audio signal includes processing the plurality of audio objects to extract the position information; and wherein the plurality of weights correspond to the respective position of each of the plurality of audio objects.

6. The method of claim 1, wherein each of the plurality of rendered signals is a binaural signal that includes a left channel and a right channel.

7. The method of claim 1, wherein the plurality of rendered signals includes a front signal and a rear signal, wherein the front signal includes a left front channel and a right front channel, and wherein the rear signal includes a left rear channel and a right rear channel.

8. The method of claim 1, wherein the plurality of rendered signals includes a front signal, a rear signal, and another signal, wherein the front signal includes a left front channel and a right front channel, wherein the rear signal includes a left rear channel and a right rear channel, and wherein the another signal is an unpaired channel.

9. The method of claim 1, further comprising:

generating, by the loudspeaker system, the plurality of rendered signals from the joint rendered signal using the metadata; and outputting, from a plurality of loudspeakers, the plurality of rendered signals.

10. The method of claim 1, further comprising:

generating headtracking data;

computing, based on the headtracking data, a front delay, a first front set of filter parameters, a second front set of filter parameters, a rear delay, a first rear set of filter parameters, and a second rear set of filter parameters;

for a front binaural signal that includes a first channel signal and a second channel signal:

generating a first modified channel signal by applying the front delay and the first front set of filter parameters to the first channel signal;

generating a second modified channel signal by applying the second front set of filter parameters to the second channel signal;

for a rear binaural signal that includes a third channel signal and a fourth channel signal:

generating a third modified channel signal by applying the second rear set of filter parameters to the third channel signal;

generating a fourth modified channel signal by applying the rear delay and the first rear set of filter parameters to the fourth channel signal;

outputting, from a first front loudspeaker, the first modified channel signal;

outputting, from a second front loudspeaker, the second modified channel signal;

outputting, from a first rear loudspeaker, the third modified channel signal; and outputting, from a second rear loudspeaker, the fourth modified channel signal.

11. A non-transitory computer readable medium storing a computer program that, when executed by a processor, controls an apparatus to execute processing including the method of claim 1.

12. An apparatus for rendering a spatial audio signal, the apparatus comprising:

a receiver configured to receive the spatial audio signal, wherein the spatial audio signal includes position information for rendering audio;

a first processor configured to process the spatial audio signal to determine a plurality of weights based on the position information, a renderer configured to render the spatial audio signal to form a plurality of rendered signals, wherein the plurality of rendered signals are amplitude weighted according to the plurality of weights; and a second processor configured to combine the plurality of rendered signals into a joint rendered signal and determine metadata that relates the joint rendered signal to the plurality of rendered signals, wherein the second processor is configured to provide the joint rendered signal and the metadata to a loudspeaker system.

* * * * *